United States Patent [19]

Hoffmeyer

[11] E Re. 28,705

[45] Reissued Feb. 3, 1976

[54] STATOR SLOT AND WINDING ARRANGEMENTS

[75] Inventor: William R. Hoffmeyer, Holland, Mich.

[73] Assignee: General Electric Company, Fort Wayne, Ind.

[22] Filed: Dec. 27, 1973

[21] Appl. No.: 428,829

Related U.S. Patent Documents

Reissue of:

[64] Patent No.: 3,633,056
Issued: Jan. 4, 1972
Appl. No.: 56,926
Filed: July 21, 1970

U.S. Applications:

[63] Continuation-in-part of Ser. No. 805,625, March 10, 1969, abandoned.

[52] U.S. Cl. ..... 310/180; 310/185; 310/188

[51] Int. Cl. ..... H02k 17/28

[58] Field of Search ..... 360/180, 189, 185, 198, 360/260, 270, 179, 183–185, 254, 172, 220–225 A

[56] References Cited

UNITED STATES PATENTS

| | | | |
|---|---|---|---|
| 1,334,831 | 3/1920 | Bergman | 310/188 |
| 2,206,308 | 7/1940 | Schurch | 310/259 X |
| 2,328,497 | 8/1943 | Romine | 310/180 X |
| 2,498,704 | 2/1950 | Oswald | 310/172/ |
| 2,649,561 | 8/1953 | Hutchins | 318/220 |
| 3,062,978 | 11/1962 | Smith | 310/185 X |
| 3,207,935 | 9/1965 | Mosousky et al. | 310/180 X |
| 3,235,762 | 2/1966 | Brammerlo | 310/185 |
| 3,421,033 | 1/1969 | Hoffmeyer | 310/172 |
| 3,421,034 | 1/1969 | Hershberger | 310/172 |
| 3,439,205 | 4/1969 | Houtman | 310/260 X |
| 3,515,919 | 6/1970 | Houtman | 310/184 |

FOREIGN PATENTS OR APPLICATIONS

| | | |
|---|---|---|
| 921,823 | 3/1963 | United Kingdom |

*Primary Examiner*—Donovan F. Duggan
*Attorney, Agent, or Firm*—Ralph E. Krisher, Jr.

[57] ABSTRACT

A stator, for use in an alternating current motor, includes a core having a plurality of angularly spaced slots. A distributed main winding is concentrically arranged in a plurality of the slots, with these slots encompassing a first arcuate region of the core, less than its circumference. End turns for the main winding are positioned adjacent an end face of the first arcuate region of the core. This provides a second arcuate region of at least one end face of the core free of the main winding. In a first embodiment, an auxiliary winding, displaced in phase from the main winding, is received in a plurality of the slots, including at least some slots in the second arcuate region. In the first embodiment, end turns of the auxiliary winding in the second arcuate region are disposed inwardly of the radially outermost edges of the slots in the second arcuate region along at least one end face of the core. In a second embodiment, the second arcuate region of one end face of the core is free of both the auxiliary winding and the main winding.

19 Claims, 4 Drawing Figures

STATOR SLOT AND WINDING ARRANGEMENTS

Matter enclosed in heavy brackets [ ] appears in the original patent but forms no part of this reissue specification; matter printed in italics indicates the additions made by reissue.

*CROSS-REFERENCE TO RELATED APPLICATION*

*This is a continuation-in-part of my co-pending application Ser. No. 805,625 filed Mar. 10, 1969 and now abandoned.*

BACKGROUND OF THE INVENTION

This invention relates generally to stators for use in alternating current motors and more particularly to an improved slot and winding arrangement for such stators.

It is desirable from both cost and weight standpoints to provide stators with cores having yoke sections as small as practicable for the desired electric and magnetic characteristics. The stator coils generally are distributed more or less completely and uniformly around the core and the associated end turns are pressed back and more or less completely cover the adjacent end face of the core.

In most cases this provides [a] *no* problem regarding mounting the motor as the mounting structure may engage the side of the core or the peripheral edge of the core end faces. However, in a number of applications such as, for instance motors to be used in compressor units for refrigeration systems, it can cause substantial problems. Many such units require the use of relatively large mounting pads which engage the end faces of the core and thus the end faces must have appropriate areas free of windings, including end turns to accept these pads.

One method of providing such areas would be to increase the cross-sectional size of the yoke at that position to provide extra end face area. Such an approach is undesirable as it unduly increases the size, weight and cost of the motor.

Prior attempts to solve this problem by distributing the coils in such a manner as to leave suitable areas free of coils have not been completely satisfactory as they generally caused substantial deterioration of the operating characteristics of the motor.

SUMMARY OF THE INVENTION

It is accordingly an object of the present invention to provide an improved stator for electric motors.

It is another object to provide an improved stator having a large end face area available for use with mounting structures.

It is yet another object of this invention to provide such an improved stator, including a concentrically arranged first winding, having a region of the yoke substantially free of at least such first winding.

It is still another object of this invention to provide such an improved stator without increasing the cross-sectional area of the yoke.

It is a further object to provide such an improved stator having very good operation characteristics.

In carrying out the objects [of] *in* one form, I provide a stator, for use in an alternating current motor, including a core of magnetic material having a plurality of substantially angularly spaced-apart, coil-accommodating slots.

In one embodiment, a distributed main winding is arranged in a plurality of the slots, and includes at least two coil groups defining at least two predetermined magnetic poles. Each of the predetermined magnetic poles has a radial polar axis, and the radial polar axes are substantially angularly spaced apart around the stator. The main winding coil groups are arranged generally concentrically about one of the radial polar axes to leave a preselected polar region of the core in the vicinity of the other radial polar axis free of the main winding coil groups.

In another embodiment, a preselected polar region of a core is free of both main and auxiliary winding coil groups.

The above-mentioned and other features and objects of this invention and the manner of attaining *them* will become more apparent, and the invention itself will be better understood by reference to the following description of illustrated embodiments of the invention, taken in conjunction with the accompanying drawings; wherein:

DESCRIPTION OF THE PREFERRED EMBODIMENT

Figure 1:
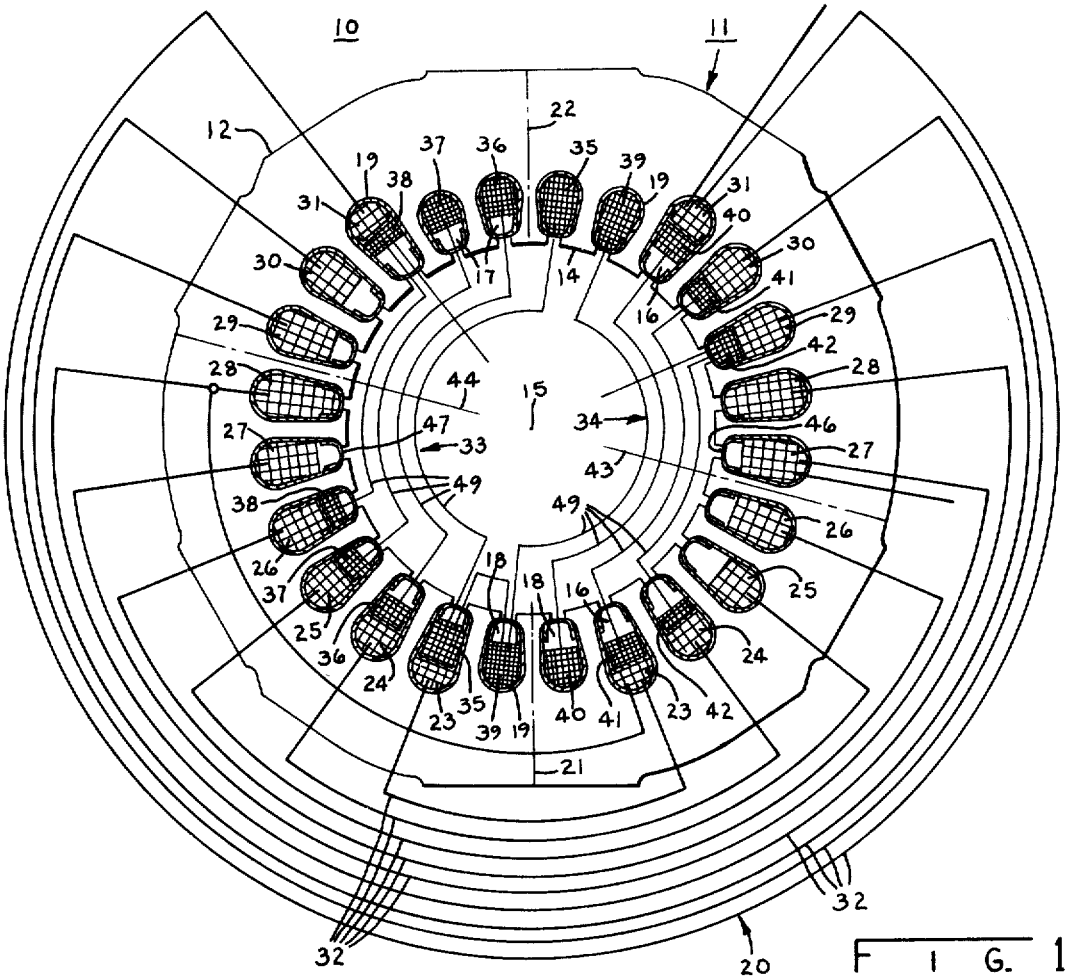
FIG. 1 is an end view, partially in section, of a stator embodying one form of the present invention, with main and auxiliary windings, end turns and circuit connections schematically illustrated to show the winding arrangement used therewith.

Referring now to the drawing in more detail and in particular to FIG. 1, for purposes of explanation and disclosure, one form of the invention has been illustrated in connection with a stator 10 for use [on] *in* a single phase induction motor. In the exemplification the stator is more particularly designed for such a motor which is designed for two pole operation. The motor also includes a conventional rotor (not shown). More specifically, as seen in the embodiment revealed by FIG. 1, the stator includes a laminated core 11 of magnetic material formed from a predetermined number of identical stacked laminations 12, punched or stamped from a sheet of suitable magnetic material. For convenience and simplicity of disclosure, the same designations will be used hereinafter to identify the components of the individual laminations and the corresponding core structure they form when the laminations are in stacked relation. The core 11 comprises a main or yoke section 12 and a plurality of teeth 13 which extend radially inwardly from the yoke to form a circular or cylindrical rotor receiving bore 14. The bore has a central axis 15 which extends longitudinally of the core.

In addition, teeth 13 form between them a plurality of substantially angularly spaced coil-accommodating slots of three types, generally indicated by the numerals 16, 17 and 18. More particularly, in the exemplification all the slots 16, 17 and 18 extend generally radially outwardly with respect to the axis 15. With the cross-sectional area of each of the slots 17 being about 50–55 percent of the cross-sectional area of each of the slots 16 and the cross-sectional area of each of the slots 18 being about 70–75 percent of the cross-sectional area of each of the slots 16. The two slots 18 are positioned side-by-side.

The slots 16 are disposed concentrically about the slots 18 with there being nine slots 16 positioned around the periphery of the bore on each side of the slots 18. Each group of slots 16 terminates short of the region diametrically opposite the slots 18, and this region generally opposite slots 18 is provided with four slots 17. Each of the teeth 13 is provided with a generally equal arcuate width so that the various slots are evenly distributed about the periphery of the bore.

Each slot is provided with a conventional slot liner 19 and these liners 19 extend longitudinally through the core along the lateral surfaces of the slots and extend longitudinally outwardly from each end of the core so as to prevent the winding forming electrical wires received in the slots from being injured by contact with the laminations forming the core.

A main winding, generally indicated at 20, of the distributed type is received in the large slots 16 and defines two magnetic poles with each of these poles having a radial polar axis, indicated by the dashed lines 21 and 22. More particularly, the distributed winding 20 consists of two coil groups arranged concentrically about the polar axis 21. The first of these groups consists of five coils 23, 24, 25, 26 and 27 which are respectively received in the five large slots 16 closest to the polar axis 21 with the two coil sides of each coil being received in the corresponding slot 16 on each side of the axis 21. The other coil group consists of four coils 28, 29, 30 and 31 which are concentrically arranged in the remaining four slots 16 on *each* side of the radial polar axis 21. The coil sides of each of these coils are also received in corresponding slots 16 on each side of the axis 21 so that the two coil groups are arranged concentrically about the radial polar axis 21. Thus the distributed winding 20 occupies and, in turn defines, a first arcuate region of the core encompassing the large slots 16 and the intermediate slots 18. That is, the first arcuate region extends from the large slot accommodating one coil side of coil 31 through the radial polar axis 21 to the large slot accommodating the other side of coil 31.

As indicated in FIG. 1, the end turns 32 for the distributed winding are positioned adjacent an end face of this first arcuate region with the end turns at each end of the stator being disposed as indicated [as indicated] for the end shown in FIG. 1. Thus a second preselected arcuately extending polar region of the core adjacent the radial polar axis 22 is provided free of the distributed winding, including the end turns associated with the distributed winding. This second or preselected arcuate polar region generally encompasses the small slots 17 [and has an arcuate polar region generally encompasses the small slots 17] and has an arcuate length of at least about 30 electrical degrees.

Some of *the* slots, including the small slots 17 are provided with an auxiliary winding, in the exemplification the auxiliary winding being a start winding. The auxiliary winding comprises two coil groups generally indicated at 33 and 34. The coil group 33 includes individual coils 35, 36, 37 and 38; one side of the coils 35–38 are received in three adjacent ones of the small slots 17 and the large slots 16 which also has one side of coil 31. The other side of the coils 35–38 are received in the large slots having one side of the coils 23–26. One side of the coils 39–42 respectively are received in the remaining small slot 17 and the large slots having one side of coils 29–31 respectively. The other side of the coils 39–42 are received in the large slots having one side of coils 23 and 24 and the two intermediate slots 18.

Thus it will be seen that the auxiliary winding is concentrically received within the core in a distributed manner and is shifted in phase from the distributed winding 20. The auxiliary winding forms an additional pair of magnetic poles having radial polar axes indicated by the dashed lines 43 and 44. In the more usual winding for this type of motor the radial polar axes 43 and 44 would be positioned at 90 electrical degrees with respect to the polar axes 21 and 22. However, it will be seen from FIG. 1 that the polar axes 43 and 44 are displaced somewhat from this perpendicular relationship with respect to the polar axes 21 and 22. This arrangement is particularly useful when the stator 10 is used in permanent split capacitor motor applications.

The following example is given in order to illustrate more clearly the relationship between the main or distributed winding 20, the auxiliary winding and the slots as it has been carried forth in actual practice. In the example, the auxiliary winding *was* formed of 0.0201 inch diameter copper wire and the main winding was formed of 0.0339 inch diameter copper wire.

| Main Winding | |
|---|---|
| Coil No. | No. of Turns |
| 23 | 23 |
| 24 | 25 |
| 25 | 27 |
| 26 | 40 |
| 27 | 51 |
| 28 | 55 |
| 29 | 43 |
| 30 | 29 |
| 31 | 26 |
| **Auxiliary Winding** | |
| Coil No. | No. of Turns |
| 35 | 77 |
| 36 | 64 |
| 37 | 57 |
| 38 | 19 |
| 39 | 77 |
| 40 | 64 |
| 41 | 57 |
| 42 | 19 |

Considering now FIG. 1, beginning at radial polar axis 22 and proceeding around the stator in a clockwise manner there is a slot-to-turns relationship as follows:

| Type of Slot By Reference No. | No. of Main Turns | No. of Auxiliary Turns |
|---|---|---|
| 17 | 0 | 77 |
| 17 | 0 | 77 |
| 16 | 26 | 64 |
| 16 | 29 | 57 |
| 16 | 43 | 19 |
| 16 | 55 | 0 |
| 16 | 51 | 0 |
| 16 | 40 | 0 |
| 16 | 27 | 0 |
| 16 | 25 | 19 |
| 16 | 23 | 57 |
| 18 | 0 | 64 |
| 18 | 0 | 77 |

-continued

| Type of Slot By Reference No. | No. of Main Turns | No. of Auxiliary Turns |
|---|---|---|
| 16 | 23 | 77 |
| 16 | 25 | 64 |
| 16 | 27 | 57 |
| 16 | 40 | 19 |
| 16 | 51 | 0 |
| 16 | 55 | 0 |
| 16 | 43 | 0 |
| 16 | 29 | 0 |
| 16 | 26 | 19 |
| 17 | 0 | 57 |
| 17 | 0 | 64 |

Thus it is clear that the coils of the main winding, which are of the largest diameter wire are confined to the large slots 16 while the intermediate slots 18 and small slots 17 receive only the auxiliary winding, formed from much smaller wire. Also, those large slots 16 which have the larger number of turns of the main winding are not required to accommodate turns of the auxiliary winding while those large slots which do have turns of both main and auxiliary windings are accommodating only a relatively small number of the main winding turns.

Thus it will be appreciated from the foregoing example that very economical use has been made of the slots of the various sizes. Also, as an important aspect of this invention the size, particularly the depth, of the slots has been reduced to enlarge the effective end face area about [the] radial polar axis 22 available for use with mounting pads. To this end, while slots 16 have a radial depth which is about one-half the width of the core from the edge of the bore 14 to the outer circumference of the stator, the slots 17 have a depth which is no more than about 37 percent of the width of the core. It will be understood that, if desired for manufacturing purposes etc., the slots 18 could be made the same size and depth as the slots 16.

Figure 2:
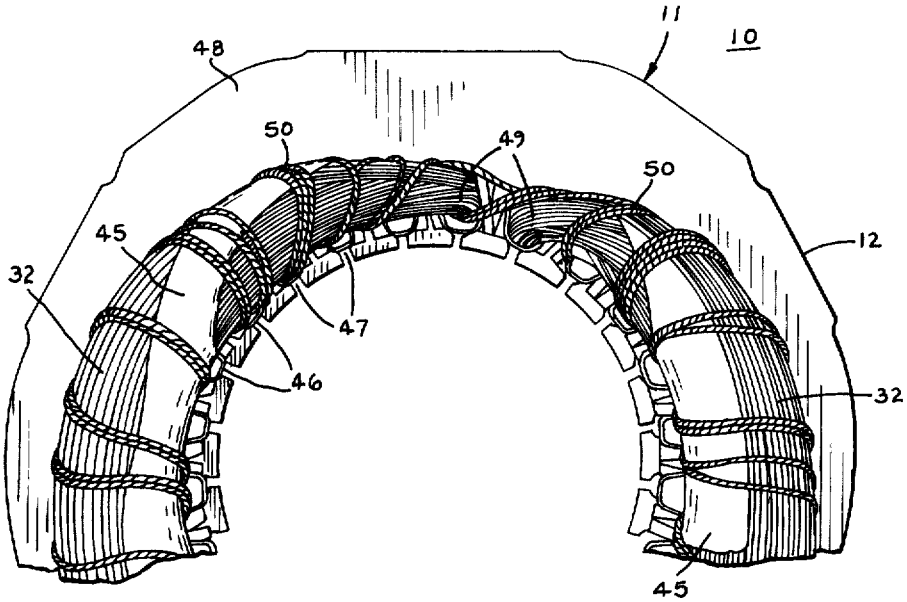
FIG. 2 is a partial end view of the stator of FIG. 1 illustrating in more detail the positioning of a portion of the end turns of the windings.

Viewing now FIG. 1 together with FIG. 2 it will be seen that those slots having turns of both windings are also provided with interwinding insulators 45 which extend the entire length of the slots and at least partially along the end turns in order to insulate the turns of one winding from the adjacent turns of the other winding. Also, insulation wedges 46 are provided in the standard way in each slot opening 47, adjacent the bore 14, to close the entrance of the slots and hold the windings therein.

As indicated most clearly in FIG. 2, the end turns 32 associated with the distributed winding 20, being of a relatively course *wire* will, when bunched as they extend around the stator next to the end face, extend radially outwardly and cover a very large portion of the end face 48 so that, in the first arcuate region encompassed by the main winding, there is little uncovered surface of the stator for use with an associated mounting structure. On the other hand the end turns 49 of the auxiliary winding are a much finer wire and, at least in the second arcuate region of the core generally encompassing the small slots 17, the end turns 49 are positioned and confined so as to be substantially disposed inwardly of the radially outermost edges of the small slots 17.

Once the windings are placed in the slots and the end turns are properly positioned, they may be laced with a suitable twine, such as that shown at 50, to secure them together into a structurally unified mass and insure that none of the individual turns come into contact with the rotor or into contact with an associated mounted structure.

It will be readily appreciated from the foregoing description and illustration that an arcuate region of at least about 30 electrical degrees, generally encompassing the small slots 17, is provided free of the main winding, including main winding end turns, and that the auxiliary winding, including its end turns in this arcuate region is substantially contained inwardly of the radially outermost edges of the small slots 17. This exposes a relatively large arcuate section of the stator with a substantial radial width which may conveniently be used for mounting the motor. It will also be seen that this has been accomplished without increasing the magnetic material content of the stator over that found in a similar stator having a conventional winding arrangement. Somewhat surprisingly, it has been found that this winding arrangement, with its improved end face exposure characteristic may be provided while still maintaining very good operational characteristics as compared to a similarly sized motor wound in a more conventional manner.

Figure 3:
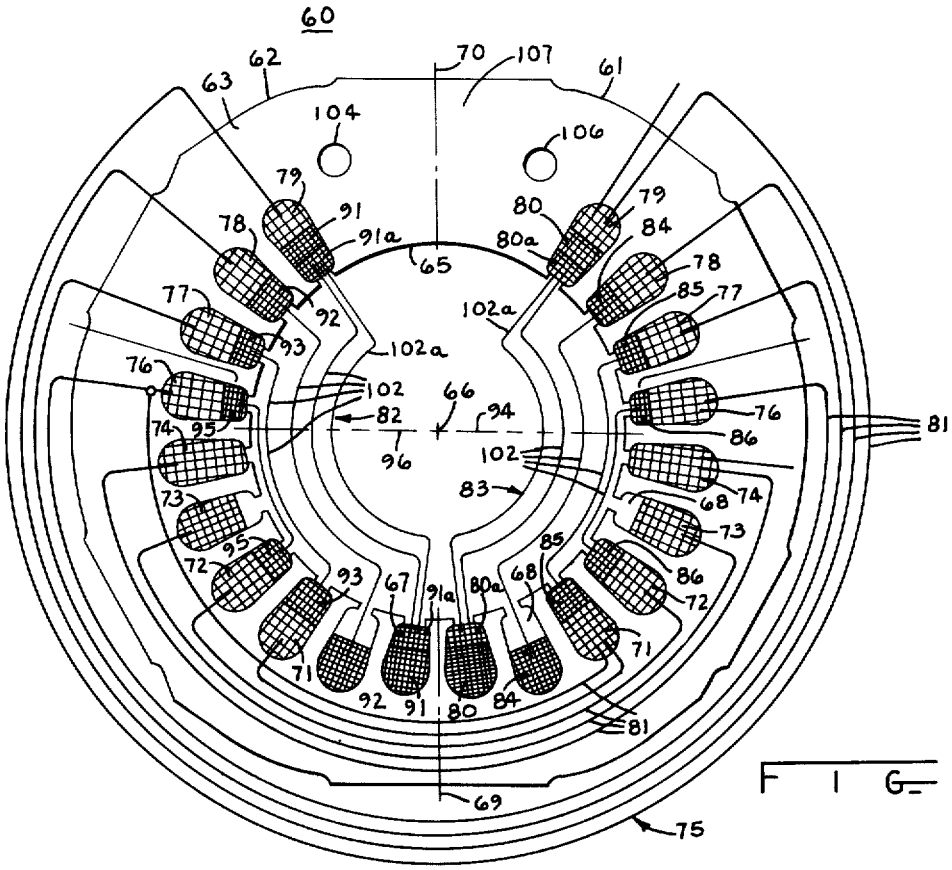
FIG. 3 is an end view, partially in section similar to FIG. 2, of another stator embodying another form of the present invention.
Figure 4:
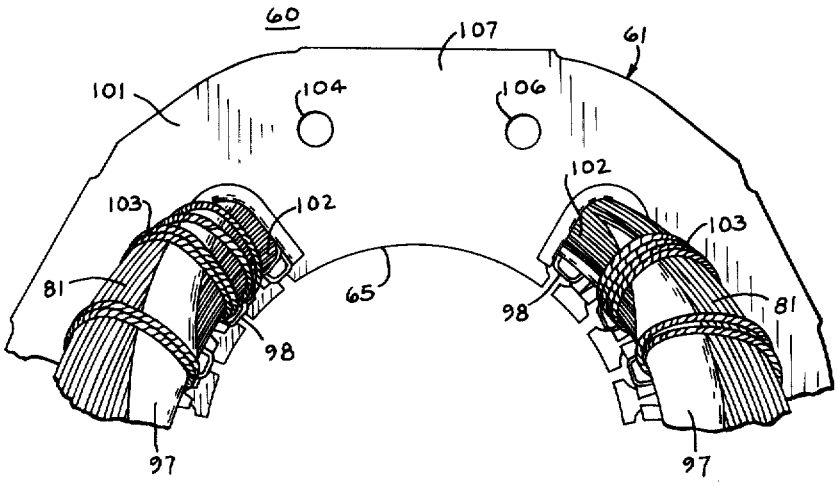
FIG. 4 is a partial end view of the stator of FIG. 3, illustrating in more detail the positioning of a portion of the end turns of the windings.

Turning now to FIGS. 3 and 4 there is disclosed still another stator 60 embodying the invention. The FIG. 3 exemplification may be used to good advantage in resistance split phase motor applications and particularly so in those applications where it is desired that an arcuate region of at least one end face of the stator core be provided substantially free of the end turns of both a main (or primary) winding and an auxiliary (or secondary) winding. Motors in which the stator 60 is used also each include, as in the case of the FIG. 1 exemplification, a conventional not shown rotor.

As best shown in FIG. 3, the stator 60 includes a laminated core 61 of magnetic material formed from a predetermined number of identical stacked laminations 62, formed in any convenient manner from suitable magnetic material. As in the case of the description of the FIG. 1 exemplification, the same designations will be used hereinafter to identify the components of the individual laminations and the corresponding core structure they form when the laminations are assembled in stacked relation to form a stator core. The core 61 includes a main or yoke section 63 and a plurality of teeth 64 which extend radially inwardly from the yoke to form a circular or cylindrical rotor receiving bore 65. The bore has a central axis 66 which extends longitudinally of the core 61.

Furthermore, teeth 64 form between them a plurality of angularly spaced coil-accommodating slots. In this exemplification, two types of slots, generally indicated by the numerals 67, 68 are illustrated although it will be understood that the slots 67 could be made substantially identical to the slots 68. However, as shown, the slots 67 are smaller than slots 68 and are just sufficiently large to permit the placement therein of a desired number of auxiliary winding coil turns as will be more specifically described hereinafter.

The slots 68 are disposed concentrically about the slots 67 with there being a total of 20 slots provided in the core 61. As will be appreciated from an inspection of FIG. 3, slots extend from both sides of a region 107 of the end face of the core 61 which is available for use with mounting structure. Each of the teeth 63 is provided with a generally equal arcuate width so that the various slots are evenly distributed about the periphery of the bore 65. As in the FIG. 1 exemplification, slot liners extending longitudinally through the core along the lateral surfaces of the slots may be used in order to protect the winding forming wires received in the slots from being injured by contact with *the* laminations forming the core.

A main or primary winding, generally indicated at 75, of the distributed type is received in the slots 68 and defines two magnetic poles with each of these poles having a radial polar axis, indicated by the dashed lines 69 and 70. More particularly, the main winding 75 includes two coil groups arranged concentrically about the polar axis 69. The first of these groups includes four coils 71, 72, 73, and 74 which are respectively received in the slots as illustrated in FIG. 3. The other coil group includes four coils 76, 77, 78, and 79 which are concentrically arranged in other ones of the slots on each side of the radial polar axis 69. Thus, the distributed winding 75 occupies and, in turn defines, a first arcuate region of the core encompassing the slots 68 and the slots 67. That is, the first arcuate region in this FIG. 3 exemplification extends from the slot accommodating one coil side of coil 79 through the radial polar axis 69 to another slot accommodating the other side of coil 79.

As indicated in FIG. 3, the end turns 81 for the distributed winding 75 are positioned adjacent an end face of this first arcuate region. Although the end turns at each end of the stator are disposed as indicated for the core end face shown in FIG. 3, it will be understood that for some mounting applications, it may be desirable to provide a region free of the distributed winding at only one end face of the core. Preferably, the preselected arcuate region should have an arcuate length of at least about 30 electrical degrees and in the exemplification, the region 107 has an arcuate length of about 50 electrical degrees.

Some of the slots, including the slots 67 are provided with a secondary or auxiliary winding, in the exemplification, the auxiliary winding being a start winding. The auxiliary winding comprises two coil groups generally indicated at 82 and 83. The coil group 83 includes individual coils 80, 84, 85, and 86; the sides of the coils being received in the slots 66 and 67 as shown in the drawing. Also, included in the coil group 83 is coil 80a which is a "backlash" winding, i.e., having turns wound in a direction opposite to that of the turns of coil 80. Similarly, the coil group 82 includes individual coils 91, 92, 93, and 95 wound in a first direction and "backlash" coil 91a. The end turns of the coils 80, 84, 85, 86, 91, 92, 93, and 95 are denoted by the reference numeral 102 whereas the end turns of the backlash coils 80a, 91a are denoted by the reference numeral 102a.

Thus, it will be appreciated that the auxiliary winding is concentrically wound on the core in a distributed manner and is shifted in phase approximately 90 electrical degrees from the distributed main winding 75. The auxiliary or secondary winding forms an additional pair of magnetic poles having radial polar axes indicated by the dashed lines 94, 96. Although the radial polar axes 94, 96 have been shown positioned at approximately 90 electrical degrees with respect to the polar axes 69, 70 for purposes of illustration, it will be understood that with the illustrated winding arrangement and coil turn distribution that follows, the polar axes 94 and 96 are actually disposed at other than 180° with respect to each other. In the following example of the coil turn distribution for a motor constructed according to the FIG. 3 exemplification, 0.0339 inch diameter copper wire was used to form the main winding 68 and 0.0159 inch diameter copper wire was used to form the auxiliary winding. Furthermore, the stator core 61 had an outer diameter of about 4.8 inches and a bore diameter of about 2.4 inches. The resistance of the main winding was about 4.19 ohms and the resistance of the auxiliary winding was about 15.2 ohms. The winding distribution of the specific exemplification was as follows:

| Main Winding | | Auxiliary Winding | |
|---|---|---|---|
| Coil No. | No. of Turns | Coil No. | No. of Turns |
| 71 | 26 | 80 | 94 |
| 72 | 50 | 84 | 32 |
| 73 | 52 | 85 | 23 |
| 74 | 53 | 86 | 19 |
| 76 | 53 | 91 | 94 |
| 77 | 52 | 92 | 32 |
| 78 | 50 | 93 | 23 |
| 79 | 26 | 95 | 19 |
| | | 80a | (34) backlash |
| | | 91a | (34) backlash |

In the exemplification, the turns of the winding were arranged to form two auxiliary magnetic poles having instantaneously opposite polarity and two main magnetic poles having instantaneously opposite polarity. The "backlash" windings 80a and 91a were provided to increase the total resistance of the auxiliary winding. A more thorough discussion of backlash winding applications where it is desirable to employ backlash windings is contained in Smith et al. patent application Ser. No. [(G.E. docket 03-HM-4135)] *56,935 on July 21, 1970* filed [concurrently herewith] and assigned to the assignee of this application *and which issued Jan. 4, 1972 as U.S. Patent 3,633,057.*

It will be appreciated that the end turns associated with the coil groups 82, 83 are disposed generally inwardly of the radially outer edge of the slots 67 and thus allow space adjacent to the end face of the core 61 for the end turns of the winding 68. In other words, the depth of the slots 67 has been selected to enlarge the effective end face area about radial polar axis 69 that is available for accommodating the end turns of the winding 68.

The arcuate region 107 of the core 61, by being free of coil turns (including end turns in the exemplification), provides an area suitable for use in mounting the core to a supporting structure. Also provided in the region 107 are a pair of longitudinally extending passageways 104, 106 which may be used in conjunction with mounting bolts that may be used to secure the stator core 61 to the mounting structure.

Now viewing FIG. 1 together with FIG. 4, it will be seen that interwinding insulators 97 are provided for the same purpose as insulators 45 in the FIG. 1 exemplification. Furthermore, insulation wedges 98 are provided in a conventional manner for each slot opening adjacent the bore 65, to close the entrance of the slots and hold the windings therein.

As shown most clearly in FIG. 4, twine, illustrated at 103, may be used to lace together the end turns of the main and auxiliary windings and secure them together into a structurally unified mass as was done in the case of the exemplification of FIG. 1. *As clearly revealed in FIG. 2 and FIG. 4, in both exemplifications, at least parts of the end turns of the auxiliary windings are conterminous with at least parts of the primary windings.*

Although the arcuate region 107 in FIG. 3 and the generally corresponding region of core 11 in FIG. 1 have been illustrated as having an arcuate extent of approximately 60 electrical degrees, and the cores 11 and 61 have been illustrated as having a substantially circular outer periphery, it will be understood that the invention may be embodied in cores of different shapes and having slot configurations other than those illustrated herein. In addition, the arcuate regions for such cores, generally corresponding to the region 107 may have an arcuate extent that is more or less than the arcuate extent of region 107.

While I have shown and described what at present [is] *are* considered to be the preferred embodiments of my invention in accordance with the Patent Statutes, changes may be made in the illustrated embodiments without actually departing from the true spirit and scope of the invention. Although the invention has been illustrated and described in connection with specific exemplifications that are particularly useful in permanent split capacitor and single-phase, two-pole, resistance split-phase motor applications, it will be understood by those skilled in the art that my invention and the benefits derived therefrom may be incorporated in other types of stators having winding coil groups forming at least two poles. It also will be understood that for ease of description of the invention, "coil groups" has been used to refer to winding sections in place on a core without implication as to whether the windings are wound directly on the core or are first wound as one, two, or more coil groupings and then positioned on the core by any suitable method. I therefore intend to cover in the following claims all such equivalent variations as fall within the invention.

What I claim as new and desire to secure by Letters Patent of the United States is:

1. For use in an alternating current motor; a stator including:

[a.] a core of magnetic material having a plurality of substantially angularly spaced apart, coil-accommodating slots;

[b.] a distributed *primary* winding arranged in a plurality of said slots and including at least [two] *one first* coil [groups] *for* defining [at least two] *a* predetermined magnetic [poles] *pole of a first instantaneous polarity, and at least one second coil for defining a predetermined magnetic pole of a second instantaneous polarity*;

[c.] each of [said at least two] *the* predetermined magnetic poles having a radial polar axis, with [said] *the* radial polar axes being substantially angularly spaced apart around said core; and

[d. said at least two coil groups] *the at least one first and second coils* being arranged generally concentrically about one of [said] *the* radial polar axes [about an] *and having portions thereof spanning an arcuate extent in excess of 180 electrical degrees and arranged* to leave a preselected polar region of said core in the vicinity of the other of [said] *the* radial polar axes free of [said at least two coil groups] *that at least one first and second coils*.

2. The invention as set forth in claim 1 wherein said preselected polar region has an arcuate length of at least 30 electrical degrees.

3. The invention as set forth in claim 1 wherein said stator also includes an auxiliary winding arranged in a plurality of said slots displaced in phase from said distributed winding; at least some of the coils of said auxiliary winding being received in slots formed in said preselected polar region of said core; the end turns associated with said last named coils being substantially disposed inwardly of the radially outermost edges of said slots in said preselected polar region.

4. For use in an alternating current motor; a stator including:

[a.] a core of magnetic material having a plurality of substantially angularly spaced apart slots;

[b.] a distributed *primary* winding concentrically arranged in a plurality of said slots;

[c.] said plurality of slots encompassing a first arcuate region of said core [,] *in excess of 180 electrical degrees and* less than its circumference; and

[d.] the end turns associated with said *primary* distributed winding being positioned adjacent an end face of said first arcuate region of said core whereby a second arcuate region of said core is provided free of said winding.

5. The invention as set forth in claim 4 wherein said second arcuate region has an arcuate length of at least about 30 electrical degrees.

6. The invention as set forth in claim 4 wherein said stator also includes an auxiliary winding arranged in a plurality of said slots, including at least some slots in said second arcuate region of said core; end turns of said auxiliary winding in said second arcuate region of said core being substantially disposed inwardly of the radially outermost edges of the slots in said second arcuate region of said core *and at least part of at least some of the end turns of the auxiliary winding being conterminous with portions of some of the end turns associated with said distributed primary winding*.

7. For use in an alternating current motor; a stator including:

[a.] a core of magnetic material comprising a yoke and a rotor receiving bore;

[b.] said bore having an axis extending longitudinally of said yoke;

[c.] said yoke defining a plurality of angularly spaced-apart slots;

[d.] a plurality of adjacent ones of said slots extending a shorter radial distance from said axis than other of said slots, said plurality of adjacent ones of said slots being disposed in one arcuate region of said core;

[e.] *a* distributed *primary* winding concentrically arranged in other of said slots; the end turns associated with said distributed winding being positioned adjacent an end face of said core in another arcuate region of said core defined by said other slots *and having an arcuate extent in excess of 180 electrical degrees*; and

[f.] an auxiliary winding arranged in at least some of said slots, including said adjacent ones of said slots; and end turns associated with said auxiliary winding, in said one arcuate region, being substantially disposed inwardly of the radially outermost edges of said adjacent ones of said slots.

8. The invention as set forth in claim 7 in which both some coils of said distributed winding and some coils of [said distributed winding and some coils of] said auxiliary winding are received in the same ones of said other of said slots; said coils of said auxiliary winding being placed therein radially inwardly of said coils of said distributed winding.

9. The invention as set forth in claim 7 wherein said one arcuate region of said core has an arcuate length of at least about 30 electrical degrees.

10. The invention as set forth in claim 7 wherein each of said adjacent ones of said slots have radial depth of no more than about 37 *percent* of the radial depth of said one arcuate region of said core.

11. For use in an alternating current motor; a core of magnetic material having a plurality of substantially angularly spaced-apart, coil-accommodating slots; a first distributed *primary* winding arranged in a plurality of said slots and including at least two coil groups defining at least two predetermined magnetic *primary* poles; each of said at least two predetermined *primary* magnetic poles having a radial polar axis, with the radial polar axes being substantially angularly spaced apart around said core; and said at least two coil groups being arranged generally concentrically about one of said radial polar axes *along an arcuate region of the core having an arcuate extent in excess of 180 electrical degrees and also arranged* to leave a preselected polar region of said core in the vicinity of the other of said radial polar axes generally free of said at least two coil groups.

12. The invention as set forth in claim 11 wherein said preselected polar region has an arcuate length of at least 30 electrical degrees.

13. The invention as set forth in claim 11 in which the magnetic core has an axis of revolution for a rotor and at least one of said coil-accommodating slots extends a shorter radial distance from the revolution axis than other of said coil-accommodating slots, said at least one slot being disposed generally in another preselected polar region of said core; said first distributed winding having end turns positioned adjacent at least one end face of said core and being extended across and angularly beyond said preselected polar region.

14. The invention as set forth in claim 13 in which a second distributed winding is arranged in some of said slots, including said at least one slot; and end turns associated with said second distributed winding [being] *are* disposed generally inwardly of the radially outer edge of said at least one slot to allow space adjacent the at least one end face of the core for end turns of the first distributed winding.

*15. A stator for use in an electric motor, the stator comprising a magnetic core having a plurality of angularly spaced apart coil accommodating slots; a main winding comprising at least two coil groups defining at least two spaced apart magnetic poles each having a radial polar axis, with each of the coil groups having end turn portions positioned adjacent at least one end face of the core; said end turn portions being arranged in a configuration adjacent the at least one end face of the core so as to extend generally adjacent to one another, so as to extend across a first one of the radial polar axes of said at least two coil groups, and so that none of said end turns of the at least two coil groups extend across a second one of the radial polar axes of said at least two coil groups whereby a first arcuate region of the at least one end face of the core is free of the end turn portions of the at least two coil groups; at least some of the end turns of some of said windings encompassing a first arcuate region of said core having an extent at least of 180 electrical degrees.*

*16. A stator for use in an electric motor, the stator comprising a magnetic core having a plurality of angularly spaced apart coil accommodating slots and a main winding comprising at least one coil group defining at least one magnetic pole having at least one radial polar axis; said main winding having end turn portions positioned adjacent at least one end face of the core and arranged in a configuration adjacent the at least one end face of the core so as to extend across the at least one radial polar axis and so as to have an arcuate extent in excess of 180 electrical degrees while another arcuate region of the at least one end face of the core is free of main winding end turn portions.*

*17. The stator of claim 16 further comprising an auxiliary winding having at least one coil group, and wherein at least portions of the auxiliary winding and portions of the main winding are disposed within a common core slot.*

*18. The stator of claim 16 wherein some of coil accommodating slots are of a first cross-sectional area, and at least one other coil accommodating slot is of a cross-sectional area that is from about 70 to about 75 percent of the first cross-sectional area; said stator further including an auxiliary winding having at least some portion thereof disposed in the at least one other coil accommodating slot.*

*19. For use in an alternating current motor; a stator including: a magnetic core having a plurality of angularly spaced apart coil accommodating slots, wherein the slots are of at least two different cross-sectional areas with the smallest of such slots being of a cross-sectional area that is at least 50 percent of the cross-sectional area of the largest of such slots; a distributed winding arranged in a plurality of the slots and including at least one coil group defining at least one predetermined magnetic pole; the at least one predetermined magnetic pole having at least one radial polar axis; said at least one coil group being arranged generally concentrically about the at least one radial polar axis to leave a preselected region of said core diametrically opposite said at least one radial polar axis free of the distributed winding; said stator also including an auxiliary winding having at least one coil arranged in a plurality of said slots displaced in phase from said distributed winding; at least a portion of the at least one coil of said auxiliary winding being received in the smallest of such slots in the core; said preselected region of said core diametrically opposite said at least one radial polar axis further being free of at least the largest of such slots.*

* * * * *